United States Patent [19]

Stålfors

[11] 3,824,019

[45] July 16, 1974

[54] DEVICE FOR DETERMINING THE ANGLE BETWEEN TWO DIRECTIONS

[75] Inventor: Rolf Lennart Stålfors, Karlskoga, Sweden

[73] Assignee: AB Bofors, Bofors, Sweden

[22] Filed: Apr. 4, 1973

[21] Appl. No.: 347,760

[30] Foreign Application Priority Data

April 5, 1972 Sweden.......................... 4332/72

[52] U.S. Cl.................................. 356/145, 356/146
[51] Int. Cl............................................... G01c 1/00
[58] Field of Search ............... 356/16, 17, 145, 146; 250/233

[56] References Cited
UNITED STATES PATENTS

| | | | |
|---|---|---|---|
| 2,494,440 | 1/1950 | Haynes | 250/233 |
| 2,994,245 | 8/1961 | Wagner | 356/145 |
| 3,572,929 | 3/1971 | Hassibi | 356/16 |

*Primary Examiner*—Ronald L. Wibert
*Assistant Examiner*—Paul K. Godwin
*Attorney, Agent, or Firm*—George Vande Sande

[57] ABSTRACT

Apparatus for determining the angle between (a) the direction from the apparatus towards a first movable object provided with a light-emitting means and (b) the direction from the apparatus towards a point on a given second object. The apparatus includes means for dividing the light which enters the apparatus from both directions into two optical ray paths. A deflecting means is effective on the light travelling only along one of the ray paths and a further means provides a manifestation which is responsive to the magnitude of deflection of said one ray path by the deflecting means. In addition, a modulating means is provided which is effective on the light travelling along only one of the ray paths, such modulating means imparting to the light on such ray path a predetermined oscillatory motion at a preselected frequency. A viewing means provides superimposed images each respectively responsive to the light travelling along a respective one of the ray paths. The modulating means causes the preselected frequency of modulation to be sufficiently high to cause the respective corresponding image on said viewing means to be indistinct and to cause any given point on the object to be described as a specific pattern which is dependent upon the nature of the oscillatory motion while concurrently the image corresponding to the unmodulated ray path is distinct.

9 Claims, 6 Drawing Figures

DEVICE FOR DETERMINING THE ANGLE BETWEEN TWO DIRECTIONS

BACKGROUND OF THE INVENTION

The present invention relates to a device for determining the angle between the direction from the device towards a first, movable object provided with a light-emitting member and the direction from the device towards a point on an aiming given second object. The device has two optical ray paths for processing light entering from said directions one of which includes a deflection device which can be actuated by an observer for variable deflection of the light entering into this ray path in two directions at right angles to each other, and indication members for indication of the deflection that has been set.

Such a device can be used in a plurality of applications, but a particularly interesting and advantageous application is its use in an optical sight for determining and correcting the deviation of an optically controlled missile provided with a tracer from the line of sight to the aiming point on a predetermined target. For this reason, in the following, the present invention will be described in detail only in conjunction with an optical sight.

In the article "The Optimization of an Optical Missile Guidance Tracker" by I. J. Spiro (Applied Optics, July, 1969, Vol. 8, No. 7) an optical sight intended for the same purpose as the sight comprising the present invention is described. In this previously known sight, the light entering into the sight is divided into two ray paths, as in the present invention. The two ray paths are refracted into one ray ahead of the ocular. In the first ray path, the position of a mirror in relation to two axes at right angles to each other can be actuated with a control lever. The first ray path thereby generates an image of the tracer, the position of which can be actuated with the control lever. In connection with the mirror, sensors are provided which generate electrical signals proportional to the position of the mirror in relation to a fixed reference. When the tracer light in the sight ocular is directed by the observer by means of the control lever so that it coincides with the aiming point of the target, the signals from the sensors represent the deviation of the missile from the line of sight to the aiming point on the target and can thus be used to correct the error in the position of the missile and guide it onto the line of sight, said electrical signals being supplied to actuation members for rudder devices provided in the missile.

In the previously known sight, in the second ray path, there is an optical filter, for filtering out the light at the wavelength of the tracer of the missile. If this filter were not provided, there would be a great risk that the observer could confuse the two tracer images in the sight, which could have extremely serious consequences. Further, the light from the target must be filtered optically out of the first ray path, so that the target will not be observed in the sight with double contours by reason of its image being, in effect, transmitted over both ray paths. It is, however, difficult to achieve in combination firstly, a monochromatic tracer in the correct wave length band: secondly, a narrow filter which lets through the same wave length band and, thirdly the corresponding narrow filter which effectively filters out the light from the target. A further drawback is also that the tracer can be observed in the sight only via the controlled mirror. Thus it is not possible to observe the actual position of the missile and to get a clear idea of the applied guidance signal versus the lag of the missile.

SUMMARY OF THE INVENTION

The above-mentioned drawbacks are eliminated entirely in a sight which comprises the present invention, which is mainly characterized in that the light entering the second ray path is arranged to pass unmodulated through same, whereby an unimpaired image of the first and second object and its background is generated, while the light entering the first ray path is arranged to be modulated by being given a certain movement with such a frequency that an image is generated in which details cannot be seen by the observer but in which the light emitting member on the first object appears in the form of a specific pattern or a symbol, depending upon the type of modulation applied, which through the actuation of the deflection device by the observer is caused to obtain a certain position in relation to the second object or, alternatively, vice versa, so that the indication members will then indicate the angle sought between said directions.

BRIEF DESCRIPTION OF THE DRAWINGS

Some particularly appropriate embodiments of a sight comprising the present invention will be described in more detail in the following, with reference to the attached, FIGS. 1–6 in which.

DETAILED DESCRIPTION OF THE PREFERRED EMBODIMENT

Figure 1:
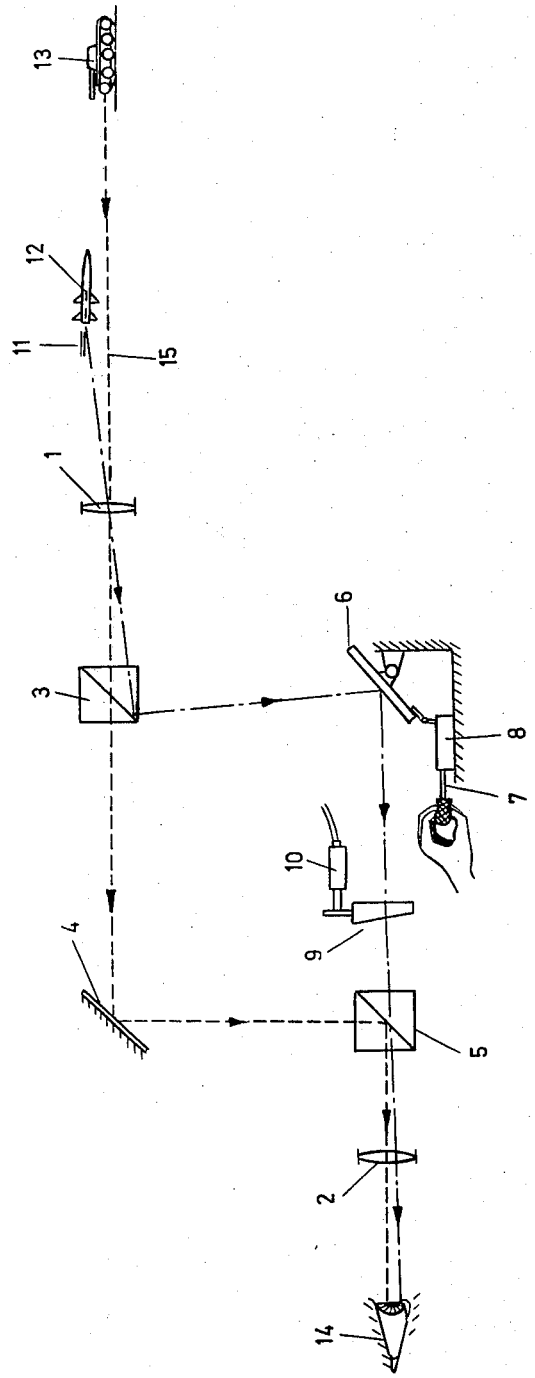
FIG. 1 illustrates one embodiment of the invention illustrating means whereby the light entering the apparatus from both a missile and a target is divided into two optical ray paths and with a modulating means being provided for only one of the ray paths.

FIG. 1 shows an embodiment with a single objective 1 and a single ocular 2. The ray path is split in a radiation divider 3 into a direct ray path via a plane mirror 4 and a radiation summation member 5 and into an indirect ray path via another plane mirror 6. The last-mentioned mirror can be controlled vertically and horizontally by means of a control lever 7 via servos or a mechanical gear in a control unit 8. Sensors (not shown) may be provided which generate a signal in dependence on the deflection of the mirror vertically and horizontally.

In the indirect ray path there is a wedge-formed prism 9, which is rotated with the aid of an electric motor 10 with a speed of more than approx. 10 r. p. s. whereby the indirect ray path will be subject to nutation. The tracer 11 on a missile 12 then describes a circle, while the visual impression of a target 13 and its background is distributed as a uniform grey tone over the image seen by the observer in the ocular. In the direct ray path the light from the target and the missile goes unimpaired via the radiation summation device to the observer's eye 14.

When the mirrors 4 and 6 are parallel and with the missile on the line of sight to the aiming point of the target, the observer sees the images from the direct and the indirect ray path superimposed on each other in the ocular, so that the image of the tracer is in the center of the circle. Let us now assume that the missile is not on the line of sight 15 to the aiming point of the target. In order to guide the missile onto the line of sight, the circle is steered onto the target by actuation of mirror 6 with the control lever, so that the center of the circle will coincide with the aiming point. At the same time, control signals are obtained from the sensors in the control unit for the missile to guide it onto the line of sight. The distance between the center of the circle and the image of the tracer is proportional to the guidance signal transmitted, and gives the observer or operator a substantial possibility of seeing directly how "hard" he is guiding the missile. When the missile begins to move in towards the line of sight to the aiming point, the tracer image consequently follows, while the circle, if the deflection of the control lever is maintained, begins to drift away from the target. If the operator guides the circle so that its center all the time coincides with the aiming point, the guiding experienced will be such that the missile steers into the circle and becomes positioned along the line of sight. Due to the fact that the position of the mirror normally can be controlled much more rapidly than the position of the missile through direct deflection, the control system here described will have the nature of position control.

Figure 2:
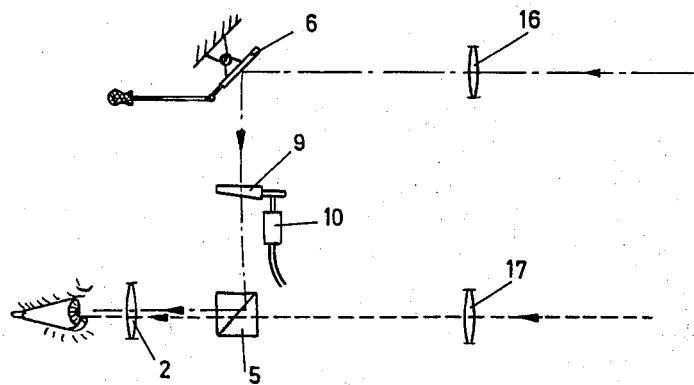
FIG. 2 illustrates an alternate embodiment of the invention of FIG. 1 in which the radiation divider is eliminated but an objective is added to the sight.

In the embodiment according to FIG. 2, the sight has two objectives. The radiation divider according to FIG. 1 is thereby eliminated, but on the other hand, an objective 17 is added to the sight. In this way, the optical efficiency in the sight can be increased.

Figure 3:
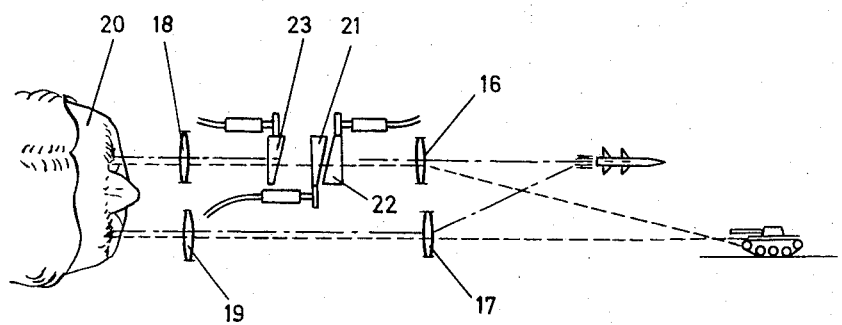
FIG. 3 discloses a further alternate embodiment of the invention of FIG. 1 employing two objectives and two oculars and also utilizing two wedge formed prisms.

In the sight according to FIG. 3, there are two objectives 16 and 17 and two oculars 18 and 19. Here the direct and the indirect ray path are entirely separated. The summation of the visual information from the two ray paths which is necessary for the control then takes place in the operator's brain 20, instead of in a summation prism.

In this FIG. 3 it is also shown how, instead of by turning a mirror, the ray path can be deflected by utilizing two wedge-formed prisms 21 and 22, which are rotated according to either of two possible alternatives. The first alternative involves their rotation independently of each other, so that the total deflection they achieve corresponds exactly to the deflection required in order to control the image of the tracer to the target. The other alternative is that the wedge-formed prisms are rotated in relation to each other exactly as much as is required in order to deflect the ray path to the angle required, after which the two prisms together are rotated as much as is required in order to deflect the ray path in the correct direction with a polar manner of viewing.

In FIG. 3 there is also a third wedge-formed prism 23 for nutation of the ray path in the usual way. However, the nutation movement can also be obtained by superimposing a constant rotating movement on the abovementioned movements of the prisms 21 and 22.

In the case of the rotating wedge-formed prisms, the control signal required for guiding the missile is deduced from the positions of the prisms in relation to a position reference, which can be fixed or rotating.

A further embodiment of the invention is to place the rotatable mirror in the direct ray path instead of in the indirect one. With this procedure, the guidance will instead be achieved by guiding the image of the target so that it comes inside the ring from the indirect ray path. This embodiment is, of course, just as conceivable for other types of deflection devices.

Further, instead of subjecting the indirect ray path to nutation, it can be given any other type of movement which causes the background of the image experienced to be blurred out, while the tracer of the missile produces a specific pattern which is dependent on the type of movement applied.

Figure 4:
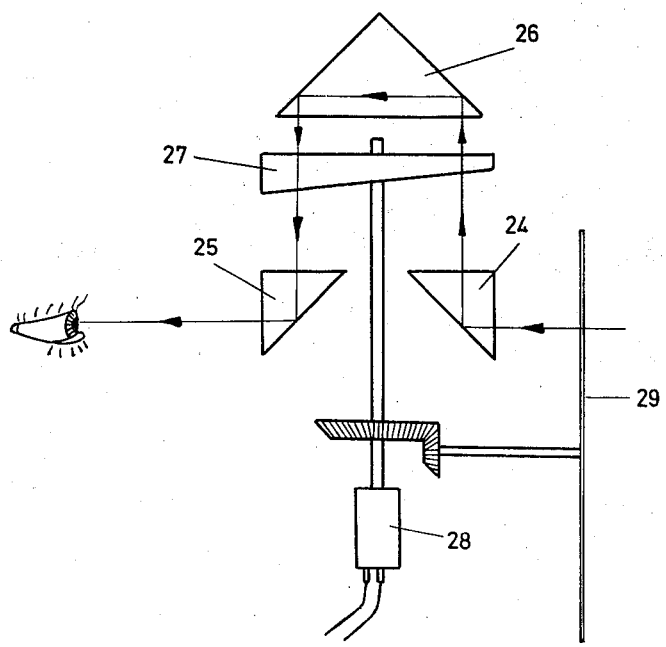
FIG. 4 illustrates a further modified form of the invention of FIG. 1 wherein the light beam in one of the ray paths is provided with a horizontal sweeping movement.

It is also appropriate to give the light in the indirect ray path a horizontal sweeping movement, but the light may then be extinguished when passing the centre point of the sweep. More specifically, the horizontal sweeping movement causes the missile flare to describe a line on the image seen by the observer in the ocular. Preferably, of course, the horizontal sweeping movement is controlled so that the mid-point of the line coincides with the aiming point. In order that the mid-point will readily be visible to the operator, it is preferable that the light be extinguished each time the beam passes the center of its sweep. FIG. 4 shows an arrangement for achieving such a type of modulation. The prisms 24, 25 and 26 are all fixed, while the prism 27 is a wedge-formed prism which is rotated with the aid of a motor 28, which also drives a diaphragm device 29 in the form of a bar, like a propeller, which causes the light to be extinguished in the ray path when passing the centre point of the horizontal sweep. The sweeping movement takes place in a direction at right angles to the plane of the paper.

It may also be mentioned that in case the light in the first ray path is given a nutational movement, instead of allowing the diameter in the circle which the tracer describes to designate a constant angle measure, the diameter can be allowed to designate a constant distance. When the missile departs, the circle is then to be seen with a decreasing diameter in proportion to the distance between the operator and the missile. This can be achieved by, for example, replacing the wedge-formed prism 9 shown in FIG. 1 with a liquid prism with a variable wedge angle or two fixed wedge-formed prisms which can be displaced, i.e. turned at an angle in relation to each other. The liquid prism or the two wedge-formed prisms are thus still to be rotated in order to obtain nutation of the ray path. The resulting deflection of the ray path after its passage through such a device is to be controlled so that it will be inversely proportional to the distance to the missile all the time. This distance can be deduced in a known way through the speed of the missile.

Figure 5:
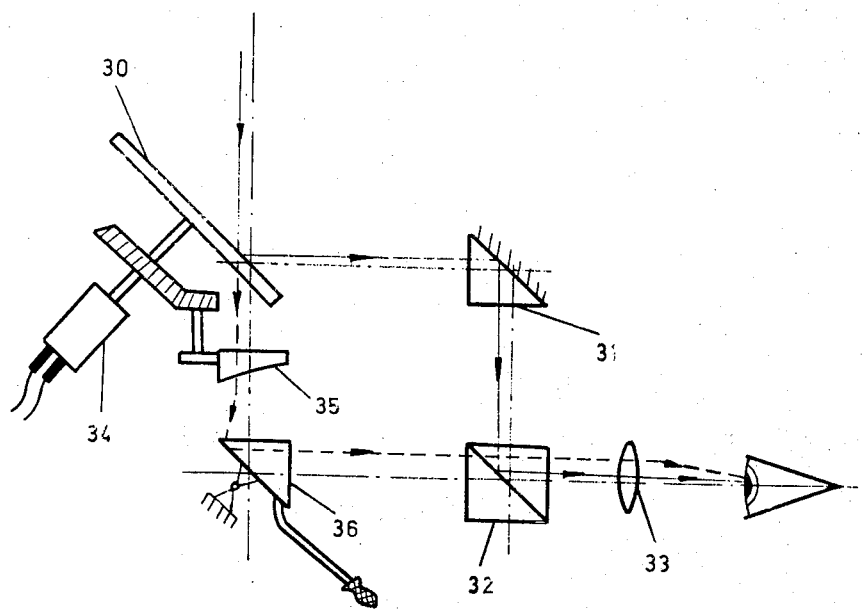
FIG. 5 illustrates a further modified form of the invention employing a mirror means and a mirror prism.

FIG. 5 shows an embodiment of the invention, in which the optical losses are very low. This embodiment is primarily intended for use in a single objective sight. The mirror arrangement shown in FIG. 5 is to be installed in the lower part of a perioscopic sight, the upper part of which in its simpliest form comprises an objective and a mirror which deflects the light 90°. A plane disc 30 is arranged at an angle of 45° to the light coming from said mirror in the upper part of the periscopic sight. The direct ray path comprises a mirror prism 31, in which the light is deflected 90° towards a radiation summation device 32, which deflects said light towards the operator's eye over an eye-piece 33.

Figure 6:
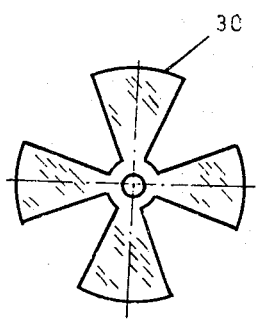
FIG. 6 illustrates a plane disc of the kind diagrammatically illustrated in FIG. 5.

FIG. 6 shows how the plane disc 30 can be built up with a number of disc elements, each one of which has the shape of a sector of a circle. One of the surfaces of the disc is covered with reflecting material and the disc is arranged with that surface facing the upper part of the periscopic sight. The disc is put on the axle of an electric motor 34, whereby the disc can be rotated in the ray path. During the rotation of the disc, the light entering the sight is by turns reflected into the direct ray path and passes between said disc elements into the indirect ray path. Thus the rotating disc acts like an image switching means, which leads the light entering the sight into the direct ray path and the indirect ray path by turns.

In the indirect ray path, the light first passes through a wedge prism 35 and is then deflected in a mirror prism 36 towards the operator's eye via the radiation summation device 32 and the eye-piece 33. The vertical and the lateral position of the mirror 36 can be controlled by the operator. The wedge prism 35 is coupled mechanically over a gear to the axle of the electric motor 34 and will during its rotation modulate, in this particular case nutate, the light coming towards same. If the mirror disc and the wedge prism are given appropriate rotary speeds, due to the inertia of the human eye the visual perception after the ocular 33 will be a continuously shining tracer in a continuous target image and a shining circle, the position of which can be controlled by the operator by means of a control mechanism attached to the movable mirror prism 36.

The invention is not limited to the embodiments described above but includes all possible modifications within the scope of the following claims. For example, as to the embodiment last described the image switching means can be designed so that during its movement (e.g. rotation) in the ray path, it will also bring about the necessary modulation (e.g. nutation) of the light in the indirect ray path.

I claim:
1. Apparatus for determining the angle between (a) the direction from the apparatus towards a first movable object provided with a light-emitting means and (b) the direction from the apparatus towards a point on a given second object comprising:
   means for dividing the light entering the apparatus from both directions into two optical ray paths,
   deflecting means effective on the light travelling only along one of said ray paths,
   means responsive to the magnitude of deflection of said one ray path by said deflecting means,
   means for directionally modulating the light travelling along only one of said ray paths by imparting thereto a predetermined oscillatory motion at a preselected frequency,
   and viewing means for providing superimposed images each respectively responsive to the light travelling along a respective one of said ray paths,
   said modulating means causing said preselected frequency of modulation to be sufficiently high to cause the respective corresponding image on said viewing means to be indistinct and to cause any given point on the object to be described as a specific pattern dependent upon the nature of said oscillatory motion while concurrently the image corresponding to the unmodulated ray path is distinct.

2. The apparatus of claim 1 wherein the predetermined oscillatory motion imparted by said modulating means is such as to cause the image corresponding to a point on the object to describe at said viewing means a circle having a constant radius.

3. The apparatus of claim 1 wherein said modulating means is effective to cause the light from said first object to describe at said viewing means a circle whose radius decreases in proportion to the increase in the distance to said first object.

4. The apparatus of claim 1 wherein said oscillatory motion imparted by said modulating means is such as to cause the corresponding ray path to have a back and forth sweeping movement and to also cause the light beam to be extinguished when the center point of the sweep is reached.

5. The apparatus of claim 2 wherein said modulating means includes a rotating wedge-formed prism.

6. The apparatus of claim 3 wherein said modulating means includes a wedge-formed prism and means responsive to the distance of said first object from said first object for varying the wedge angle of said prism.

7. The apparatus of claim 1 which further includes image switching means for alternating the light from said object between the two ray paths, the switching occurring sufficiently rapidly to provide visual images to the observer in which the images of said first and second objects and the background are continuous in time.

8. The apparatus of claim 7 wherein said image switching means and said modulating means cause the image switching and the modulation to occur in synchronism.

9. The apparatus of claim 7 wherein said image switching means comprises a disc formed of a plurality of disc elements each shaped as a section of a circle, one of the surfaces of said disc being light reflecting, said disc being positioned at an angle to, and with its said one surface directed toward, the light entering said apparatus from said objects.

* * * * *